June 24, 1924.
C. E. BARNES
1,499,284
ICE CREAM CAN CARRIER
Filed Sept. 8, 1923
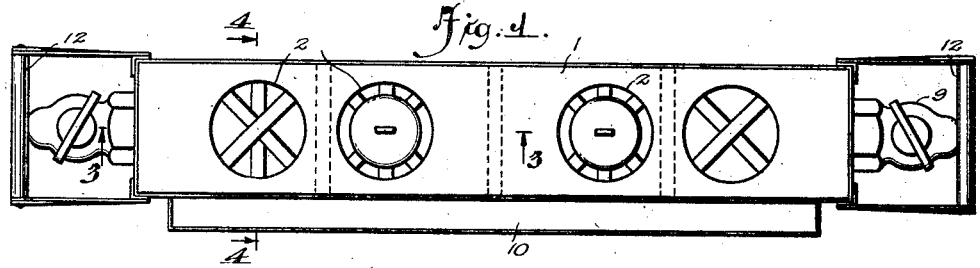
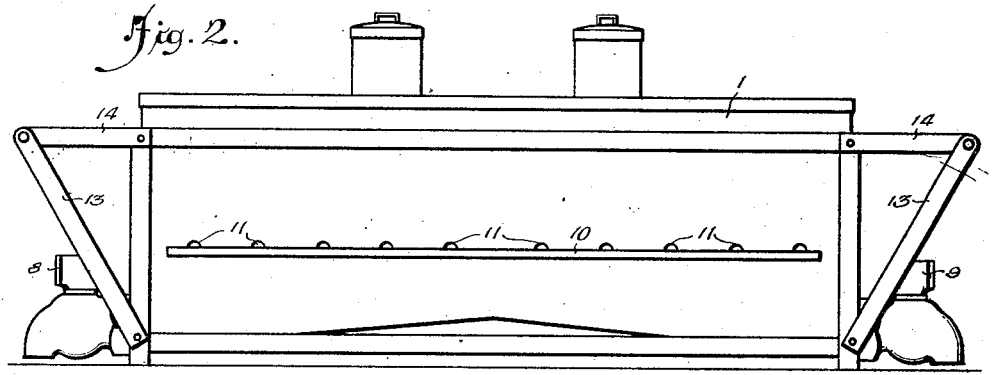
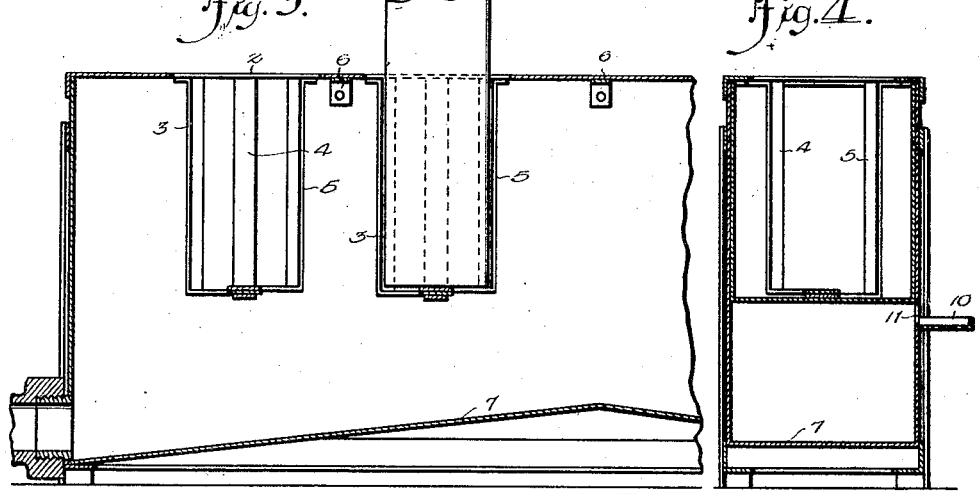
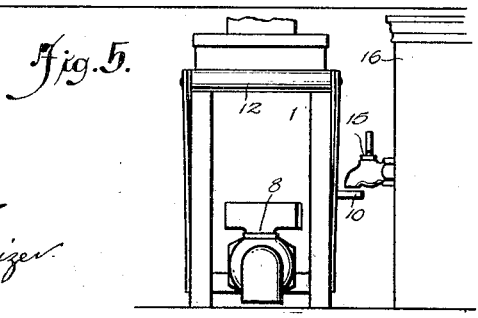
INVENTOR
C.E.BARNES
ATTORNEYS Patented June 24, 1924.

1,499,284

UNITED STATES PATENT OFFICE.

CLARENCE E. BARNES, OF ST. JOSEPH, MISSOURI.

ICE-CREAM-CAN CARRIER.

Application filed September 8, 1923. Serial No. 661,709.

*To all whom it may concern:*

Be it known that I, CLARENCE E. BARNES, a citizen of the United States, and a resident of St. Joseph, in the county of Buchanan and State of Missouri, have invented a new and Improved Ice-Cream-Can Carrier, of which the following is a full, clear, and exact description.

This invention relates to a carrier for ice cream cans, and has for an object the provision of a simple and efficient device whereby workmen delivering a plurality of cans of ice cream to a store can carry them in all at once and can simply and easily transpose them to the proper cabinets and drain-system cabinets without the fuss and trouble that is now experienced.

Another object concerns the provision of means whereby the apparatus can be made economically and is especially simple and rugged in its construction.

In handling ice cream cans in accordance with the present methods, the workmen have to carry a single can into the store from the delivery wagon and place it on the floor, then the empty can is taken from the store's ice cream cabinet over the ice and placed on the floor, which, because the can is wet, gets water all over the floor; then the cabinet has to be drained of water in a bucket, which has to be emptied each time it is filled, and this may occur several times before the cabinet is completely drained; then the new can has to be lifted into place in the cabinet. All this takes time and trouble and involves an amount of unnecessary labor and fuss that can be readily avoided by the use of my device.

The invention is illustrated in the drawings, of which—

Figure 1 is a plan view of the device;

Fig. 2 is a side elevation thereof;

Fig. 3 is a section taken on the line 3—3 of Fig. 1;

Fig. 4 is a section taken on the line 4—4 of Fig. 1; and

Fig. 5 is a side elevation of the carrier disposed adjacent the ice cream cabinet and ready to drain the same.

The form of the invention shown in the drawings is a preferred form, although it is understood that modifications in the construction and arrangement of the parts and in the character of the materials used may be adopted without departing from the spirit of the invention.

The invention as illustrated in the drawings includes a container 1 closed on all sides and having a plurality of openings such as 2 in its top of the proper size to receive ice cream cans and into which they are inserted. Within the container beneath each opening is mounted a can-supporting frame. Each of these frames comprises a plurality of U-shaped strips of metal, such as 3, 4 and 5, which are suitably connected to the underside of the container adjacent the openings and overlap each other along their base portions, as shown, so as to provide a sort of metal cage for the container. There is a frame of this sort beneath each opening; and, of course, there may be as many openings as there are desired cans to be carried. The top of the container is also braced or reinforced by reinforcing strips such as 6 which extend across the top and are bent down at the ends and riveted at the sides of the container at suitable intervals. On its bottom the container is provided with a bottom plate 7 which slopes from its middle downwardly toward each end of the container, so that any liquid held in the bottom will flow toward either end and can be drained out from the container through petcocks such as 8 and 9 which are located at the ends of the container near the bottom.

To one side of the container a trough 10 is connected, and a plurality of holes such as 11 are formed in the side wall of the container adjacent the trough, so that any liquid received on the trough 10 will flow through said holes, dropping into the bottom of the container.

The container is provided with suitable handle bars such as 12 at each end, which are connected by metal strips such as 13 and 14 to the container to form a firm frame for the handle bars, whereby it can be easily carried by a man at each end of the carrier.

In the operation of the device, a suitable number of filled ice cream cans are placed in the openings and supported on basketlike frames therebeneath. The carrier is then transported into the store and placed adjacent the ice cream cabinet, with the trough disposed beneath the petcock or outlet faucet such as 15 of said cabinet, which is represented by the numeral 16 in Fig. 5. By placing the carrier right next to the ice cream cabinet, it is a simple matter to lift a can out of the carrier and place it in the cabinet, prior to which an empty can has been lifted from the cabinet and can be immediately substituted for the filled can in the carrier. When the cans have thus been removed, the faucet on the cabinet can be opened and the water therein will drain off into the trough, passing thence through the holes 11 into the bottom of the carrier. This container or carrier can then be carried back to the wagon, and before being put therein the petcocks or faucets at the end can be opened and let the water flow out into the street.

In this way the transfer of the cans is rendered exceedingly simple and convenient, eliminating much undue labor and fuss and eliminating the wetting of the store floors, and also making exceedingly simple the draining of the cabinet and the disposal of the drainage.

What I claim is:—

1. An ice cream can carrier which includes a container having a plurality of openings therein, and a strip-metal basket frame disposed beneath each opening to support a can therein.

2. An ice cream can carrier which includes a container having a plurality of can-receiving openings in the top thereof, frames of strip metal disposed beneath each opening to support the cans, a sloping bottom formed on said container, discharge faucets at each end of the container near the bottom, and a trough extending from the side of the container, said container having a plurality of holes in its side wall opening adjacent said trough to receive water drawn into said trough.

3. An ice cream can carrier which includes a container having a plurality of can-receiving openings in its outer surface, a plurality of U-shaped metal strips disposed beneath each opening and forming a basket frame to support a can in said opening, the bottom of the container being sloped from the center toward the ends so that liquid dropping thereon will flow toward the ends, discharge faucets at the ends of the container, a trough on the side of the container to receive drainage from the ice cream cabinet, said container having a plurality of holes in its side wall adjacent the trough to permit the drainage to pass therethrough and drop on to the bottom of the container.

CLARENCE E. BARNES.